United States Patent [19]

Stroh et al.

[11] 4,370,903
[45] Feb. 1, 1983

[54] METHOD AND APPARATUS FOR COMPUTING MOTOR SPEEDS FOR INITIATING AND ENDING JOLT CONTROL DURING GEARSHIFT IN A DRIVE SYSTEM USING FLUID COUPLINGS OR TORQUE CONVERTERS

[75] Inventors: Walter Stroh, Cleebronn; Manfred Schwab, Gerlingen, both of Fed. Rep. of Germany

[73] Assignee: Robert Bosch GmbH, Stuttgart, Fed. Rep. of Germany

[21] Appl. No.: 170,130

[22] Filed: Jul. 18, 1980

[30] Foreign Application Priority Data

Aug. 25, 1979 [DE] Fed. Rep. of Germany ....... 2934477

[51] Int. Cl.³ .............................................. B60K 41/08
[52] U.S. Cl. ....................................... 74/858; 74/851; 74/866
[58] Field of Search ................. 74/858, 851, 852, 866, 74/872, 874, 859

[56] References Cited

U.S. PATENT DOCUMENTS

| | | | |
|---|---|---|---|
| 3,712,156 | 1/1973 | Kuhnle | 74/872 X |
| 3,792,631 | 2/1974 | Mori | 74/866 |
| 3,814,224 | 6/1974 | Podssuweit | 74/858 X |
| 4,200,007 | 4/1980 | Espenschied et al. | 74/872 |
| 4,226,141 | 10/1980 | Espenschied | 74/858 |
| 4,266,447 | 5/1981 | Heess et al. | 74/866 |

Primary Examiner—Rodney H. Bonck
Attorney, Agent, or Firm—Frishauf, Holtz, Goodman & Woodward

[57] ABSTRACT

In previously known jolt control equipment, it was necessary to know the speed of the turbine of a fluid coupling or hydraulic torque converter driving the automatic transmission. According to the present invention, the turbine speed is assumed to be the same as the impeller or motor speed after the torque transmission through the automatic transmission has been interrupted. Under these conditions, very little slippage in the fluid coupling takes place and the turbine speed is equal to the impeller or motor speed to a sufficient accuracy. The synchronous turbine speed which determines when the jolt control is to be initiated and terminated is computed from the transmission output speed multiplied by the speed ratio between turbine and transmission output in the gear to be engaged.

11 Claims, 2 Drawing Figures

METHOD AND APPARATUS FOR COMPUTING MOTOR SPEEDS FOR INITIATING AND ENDING JOLT CONTROL DURING GEARSHIFT IN A DRIVE SYSTEM USING FLUID COUPLINGS OR TORQUE CONVERTERS

CROSS REFERENCE TO RELATED APPLICATIONS AND PUBLICATIONS

U.S. patent application Ser. No. 89,465, filed Oct. 30, 1979 and assigned to the same assignee, now issued as U.S. Pat. No. 4,266,447.

The above application is hereby incorporated by reference into the present application.

The present invention relates to jolt control systems and methods and, more particularly, to the determination of the motor speed at which the jolt control is to be initiated and ended.

BACKGROUND AND PRIOR ART

In known automatic transmissions, the shifting between two gears requires, generally, the releasing of a clutch or brake and the application or closing of another clutch or brake. The disengagement and engagement of the various members is carried out in a rigidly controlled time sequence. Undesired jolt may occur during such shift processes, particularly when the shift is a downshift with the interruption of torque transmission.

THE INVENTION

It is an object of the present invention to furnish a method and system whereby the shift process is controlled as a function of the rotary speed of the turbine of a fluid coupling or torque converter in such a way that jolt is decreased. The synchronous speed of the turbine is computed from the transmission output speed and the speed ratio of the automatic transmission. Particular control steps may be carried out a short time before the actual turbine speed has reached the synchronous speed. The present invention is based on the realization that, when the transmission of torque through the automatic transmission is interrupted, the input torque to the transmission is approximately zero and therefore the slippage between the rotary speed of the impeller and that of the turbine is also approximately zero. The turbine is thus rotating at approximately the same rotary speed as the impeller. However, the impeller of the fluid coupling or torque converter is rigidly coupled to the motor. Under conditions of torque interruption through the automatic transmission, it is therefore possible to utilize the motor speed to represent the rotational speed of the turbine. The present invention thus allows an implementation of the shock control according to U.S. application Ser. No. 89,465 even when it is impossible or undesirable to separately determine the rotational speed of the turbine wheel.

In accordance with the present invention, a synchronous speed signal is generated by multiplying a signal indicative of the transmission output speed by a speed ratio factor. The jolt control steps are then initiated when the speed of the motor, i.e. the rotational speed of the impeller, has a predetermined relationship to the so-computed synchronous speed.

More specifically, in a preferred embodiment, the transmission output signal used to compute the synchronous speed signal is based on the transmission output signal at the start of the shift. In a further preferred embodiment, the transmission output speed is sensed continuously during the shifting process so that changes in the vehicle speed are also considered.

The method and apparatus of the present invention may be used to decrease the jolt by decreasing the output torque of the motor during a suitable time interval in the gearshift operation. This decrease in motor torque preferably starts just prior to the time in which a freewheel within the automatic transmission engages. This embodiment is not, however, limited to the case in which a freewheel is provided. It can also be applied to situations in which a brake or clutch is provided which stop the rotation of a member at a particular time, the member then starting to turn in the opposite direction to that in which it was turning previously.

Both the method and the apparatus for carrying out the above-described operations are a part of the present invention.

Of course, this method is also applicable to control the engagement of a clutch, if no freewheel is used.

DRAWING DESCRIBING PREFERRED EMBODIMENTS:

Figure 1:
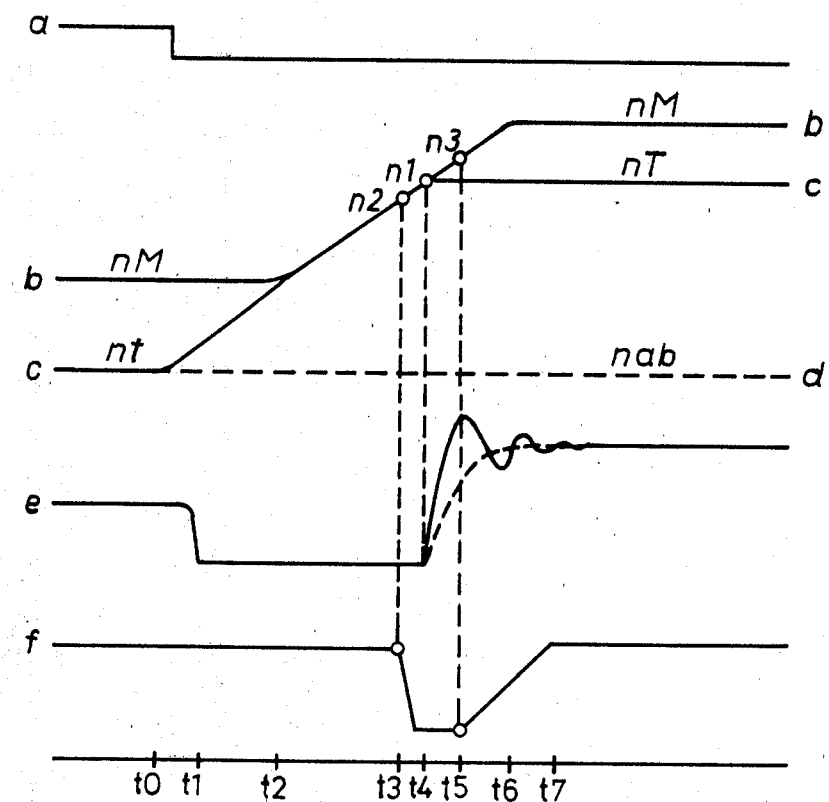
FIG. 1 shows a series of curves illustrating the variation with respect to time of various operating parameters of the drive system.

In FIG. 1, the variation with respect to time of various parameters in a motor vehicle having an automatic transmission and wherein the motor is coupled to the automatic transmission is shown either by a fluid coupling or a torque converter. In line a, the downward step indicates a gear initiate signal, that is a signal initiating a shift from the direct into the next lower gear. The variation of motor speed with respect to time is illustrated in line b, while the rotational speed of the turbine, the output speed of the transmission and the transmission output torque are illustrated in curves b, c, d, and e, respectively. Curve d is in dashed lines. In curve e, the dashed portion indicates the variation of transmission output torque in the presence of jolt control, while the solid line indicates the same variation in the absence of jolt control. Line f shows the variation with respect to time of motor torque, which is changed by the jolt control.

Following receipt of the shift initiate signal at time t0, a short time elapses as required by the hydraulic characteristics of the automatic transmission, until at time t1 the clutch or brake which is to be released during the shift is actually released. The torque transmission between the motor and the output of the automatic transmission is thus interrupted. This is illustrated by the decrease in transmission output torque (curve e). At time t1, the rotational speed of the turbine nT is still lower than the motor speed nM. The hydraulic converter thus has a noticeable slippage which, among other things, depends upon the torque delivered by the motor. At time t1, the torque furnished by the turbine approaches zero. The turbine speed nT therefore accelerates if the motor speed remains the same, the motor delivering the power required for accelerating the turbine. Since, in the absence on load on the turbine, the slippage of the fluid coupling is approximately zero, the motor speed and the turbine speed will rapidly become equal. This occurs at time t2. After time t2, both the motor speed and the turbine speed continue to increase.

Let is be assumed that the synchronous speed computed as a function of the then-present vehicle speed and the speed ratio of the automatic transmission will be n1 after the downshift. If the motor torque would remain the same, the freewheel of the automatic transmission would, when the turbine speed has reached the value n1, engage with great force. The oscillations indicated in the rightmost portion of curve e would then take place because of oscillations in the members transmitting the torque. This would lead to excessive torques being generated and, therefore, a very disturbing jolt.

To prevent the above, the output torque of the motor (curve f) is substantially decreased when the turbine and motor speeds have reached the value n2. When the synchronous speed n1 is reached, the freewheel will then engage with a greatly decreased jolt, or without any such jolt. As soon as the freewheel has engaged, that is as soon as the transmission member coupled to the freewheel has been blocked in its motion, torque can again be transmitted between the motor and the automatic transmission output. From then on, the turbine speed remains approximately constant for the illustrated example, while the motor speed continues to increase. The motor speed increases until the slippage in the coupling which is required to transmit the motor torque has again been reached.

Theoretically, it would be possible to increase the motor torque again as soon as the synchronous speed has been reached. This is not done for safety reasons. Particularly, if the motor torque were increased at too early a time, there would be no decrease in the undesired jolt. For this reason, the jolt control of the motor is terminated a short while after time t4, that is the time at which the motor speed has reached the synchronous speed. In the example shown, the jolt control is ended when the motor speed nM has reached the value n3 which is somewhat higher than the speed n1. This occurs at time t5. Starting at a time t6, the motor speed then again remains constant. The jolt can also be decreased by terminating the jolt control at time t5 gradually, rather than suddenly. This is illustrated by curve f where, starting at t5, the motor torque is allowed to increase gradually until time t7. Time t7 occurs shortly after time t6. The output torque of the transmission increases from time t4 until time t7 to a new value which depends upon the motor output power and the vehicle speed.

It must be stressed that, because the speed difference between the motor (i.e. the impeller) and the turbine undergoes large oscillations depending upon the load conditions and the absolute value of speed, it is impossible to compute the turbine speed from the motor speed as long as torque is being delivered at the transmission output. As soon as the torque transmission between the driving motor and the transmission output is interrupted and the turbine speed has become approximately equal to the motor speed, the latter is a sufficiently good measure for the turbine speed.

Figure 2:
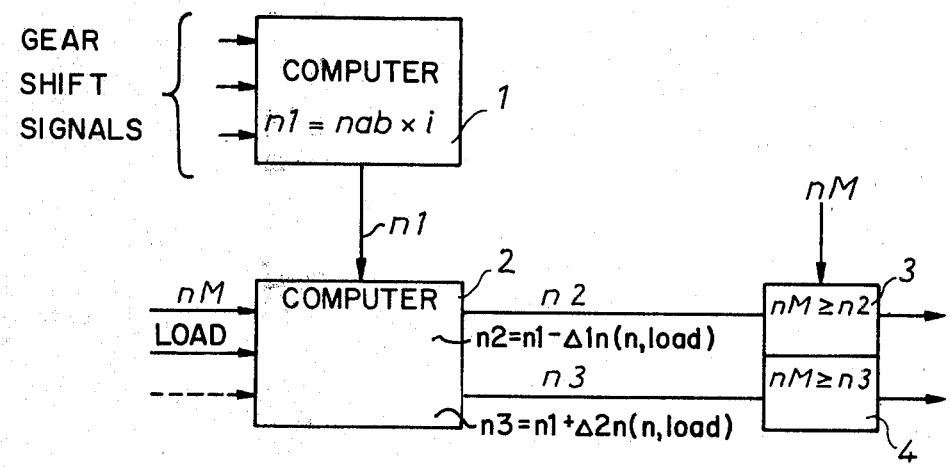
FIG. 2 is a block diagram of the apparatus according to the present invention.

The apparatus according to the present invention is illustrated in FIG. 2. It includes a first computer 1 which receives signals nab indicative of the then-present transmission output speed, a "gear" signal indicative of the gear to be newly engaged, and the shift initiation signal. A number of speed ratios i indicative of the speed ratio between the turbine and the transmission output speed are stored in computer 1. Following receipt of the shift initiate signal, the latter computes the synchronous speed according to the formula $n1 = nab \times i$. Since the transmission output speed is continuously monitored, changes in the vehicle speed during the shift process are taken into consideration. The computed synchronous speed n1 is applied to a second computer 2. In the latter, the speeds at which the motor jolt control is to be, respectively, initiated and ended are computed according to the formulas:

$$n2 = n1 - \Delta 1n \text{ (nM, Load) and}$$

$$n3 = n1 + \Delta 2n \text{ (nM, Load).}$$

The signals which have to be applied to the second computer in order that these values may be computed are the measured value for motor speed nm and the measured load value, that is the value corresponding to the position of the gas pedal. The computer than furnishes number n2 and n3 which, respectively, indicate the speed at which the jolt control is to be initiated and ended. The signals n2 and n3 are, respectively, applied to a comparator 3 and a comparator 4. The second input of comparators 3 and 4 receives a signal indicative of then-present motor speed. As soon as the motor speed exceeds speed n2, the jolt control is initiated. The motor jolt control can take place in any desired way. All that is important is that the output torque of the motor is decreased. Thus, a change in ignition timing, a decrease in the amount of fuel injected per cycle, partial closing of the throttle valve or any other desired method of control can be used.

A particularly effective jolt reduction results when the speed differences $\Delta 1n$ and $\Delta 2n$ are computed utilizing both the then-present engine speed and the load. When the computations are carried out with these considerations, the speed differences vary with engine speed and load and a particularly good matching of the jolt control to the actual operating conditions results. However, in the simplest case, the speed differences $\Delta 1n$ and $\Delta 2n$ may be fixed values. If so, they should be chosen so that they are particularly well matched to those shift processes which occur most often, that is for the shift processes which occur most often the most effective jolt control should result.

The speed n2 and n3 can be computed as is disclosed in U.S. Pat. No. 4,266,447. The content of this application is herein incorporated by reference to constitute a part of the present application. The present application improves the system and method of the above-mentioned application in, among other things, the following way. It becomes possible to use the system and method of U.S. Pat. No. 4,266,447 even for drive systems in which a fluid coupling or a hydraulic torque converter drives the automatic transmission and in which it is impossible to directly sense the speed of the turbine.

Various changes and modifications may be made within the scope of the inventive concepts.

We claim:

1. In a method for controlling a gearshift process carried out with interruption of torque transmission in a drive system having automatic transmission means operable in a plurality of gear ratios and having a transmission input member and a transmission output member, and hydraulic coupling means having a coupling output member for driving said automatic transmission input member and a driven coupling input member, the improvement comprising the steps of generating a transmission output speed signal indicative of the rotary speed of said transmission output member;

multiplying said output speed signal by a selected one of said plurality of gear ratios of said automatic transmission, thereby creating a synchronous speed signal;

generating a hydraulic coupling input speed signal indicative of the rotational speed of said driven coupling input member of said hydraulic coupling means;

generating a torque-interruption signal upon interruption of torque transmission between said transmission input and output members during operation of a gearshift process;

comparing said hydraulic coupling input speed signal to said synchronous speed signal following said generation of said torque interruption signal, and initiating at least one predetermined control step in said gearshift process when said synchronous speed signal has a predetermined relationship to said input speed signal.

2. A method as set forth in claim 1, wherein said hydraulic coupling means comprises a fluid coupling having an impeller constituting said coupling input member and a turbine constituting said coupling output member.

3. A method as set forth in claim 1, wherein said hydraulic coupling means comprises a torque converter having an impeller constituting said coupling input member and a turbine constituting said coupling output member.

4. A method as set forth in claim 1, wherein said gearshift process is a gearshift from a first to a second predetermined gear; and
wherein said selected one of said gear ratios is the gear ratio of said second predetermined gear.

5. A method as set forth in claim 4, wherein said gearshift is a downshift.

6. A method as set forth in claim 4, wherein said step of generating said output speed signal comprises generating said output speed signal before the start of said gearshift process.

7. A method as set forth in claim 6, wherein said output speed signal is further generated continuously after said start of said gearshift process.

8. A method as set forth in claim 1, further comprising a motor driving said coupling input member; and
wherein said one predetermined control step is decreasing the output torque of said motor.

9. In a drive system having a motor, hydraulic coupling means driven by said motor, automatic transmission means driven by said hydraulic coupling means and operable in a plurality of selectable gear ratios, and means for furnishing a first signal indicative of the output speed (nab) of said automatic transmission means a second signal indicative of the then-engaged gear and a third signal indicative of initiation of a gearshift, the improvement comprising apparatus for furnishing a fourth and fifth signal respectively initiating and ending an externally controlled reduction of output torque of said motor for decreasing jolts during a gearshift, comprising first computing means (1) having speed ratios corresponding to each of said selectable gear ratios stored therein, for multiplying said first signal by a selected one of said speed ratios, thereby creating a synchronous speed signal;

second computing means (2) connected to said first computing means for computing a first and second (n2, n3) desired motor speed signal in dependence upon said synchronous speed signal and a first and second speed increment signal ($\Delta 1n$, $\Delta 2n$); and means (3) for furnishing said fourth and fifth signals when the speed of said motor is equal to said first and second desired motor speeds, respectively.

10. Apparatus as set forth in claim 9, wherein said first and second speed increment signals are fixed values stored in said second computing means.

11. Apparatus as set forth in claim 9, wherein said second computing means computes said first and second speed increment signal in dependence upon then-present motor speed and then-present motor load.

* * * * *